April 30, 1946. P. I. KLEIN ET AL 2,399,231
DENTAL INSTRUMENT
Filed Feb. 10, 1945
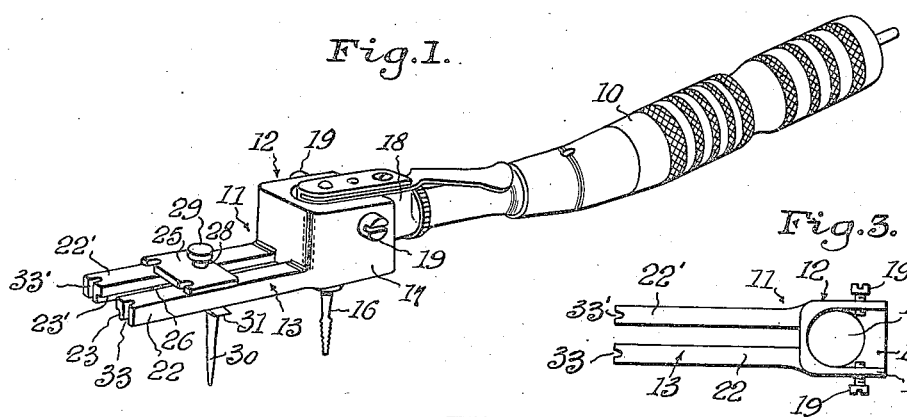
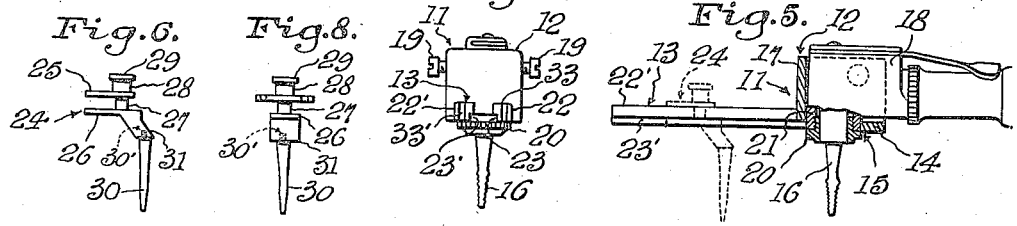
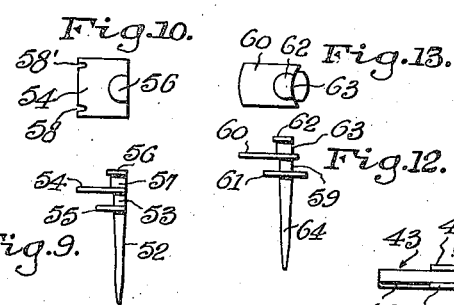
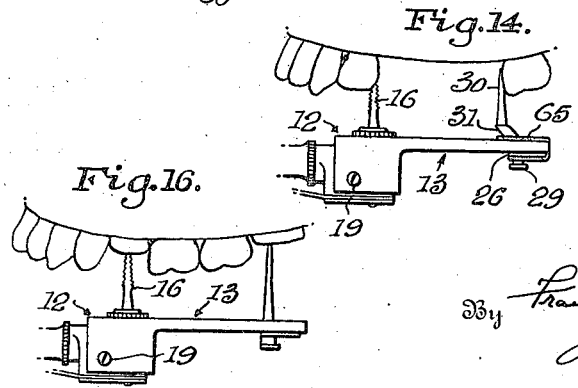
Inventors
Philip I. Klein
Aaron Z. Shevsky
Attorneys Patented Apr. 30, 1946

2,399,231

UNITED STATES PATENT OFFICE 2,399,231

DENTAL INSTRUMENT

Philip I. Klein, United States Army, and Aaron Z. Shevsky, United States, Army, Charlotte, N. C.

Application February 10, 1945, Serial No. 577,248

11 Claims. (Cl. 32—67)

(Granted under the act of March 3, 1883, as amended April 30, 1928; 370 O. G. 757)

The invention described herein may be manufactured and used by or for the Government for governmental purpose, without payment to us of any royalty thereon.

This invention relates generally to dental instruments but more particularly to a paralleling gauge for attachment to the handpieces of dental engines.

One object of the invention is to provide a simple and inexpensive gauge which may be detachably connected to the hand piece of a dental engine for accurately drilling or cutting one or more holes or channels parallel to another.

Another object of the invention is to provide a gauge which is adapted automatically to retain the drill in cutting contact with the parallel channel being drilled.

A further object of the invention is to provide a gauge which may be easily inserted into the mouth of the patient with the drill with which it operates.

Another object of the invention is to provide a gauge of the type described comprising few parts which may be easily assembled into operative position or may be readily disassembled and sterilized.

With these and other objects in view, this invention consists in certain novel details of construction, combinations and arrangement of parts to be more particularly hereinafter described and claimed.

Referring to the drawing, in which like parts are indicated by similar reference characters:

Fig. 1 is a perspective view showing the gauge attached to an angle hand piece;

Fig. 2 is a partially sectionized elevation showing a modified form of gauge attached to a straight hand piece;

Fig. 3 is a top plan view of the gauge adapted to fit an angle hand piece;

Fig. 4 is an end elevation of the gauge shown in Fig. 3;

Fig. 5 is a partially sectionized side elevation of the gauge shown in Figs. 3 and 4 attached to an angle hand piece;

Fig. 6 is a side elevation of one form of adjustable slide member having an offset gauge pin;

Fig. 7 is a top plan view of the gauge slide shown in Fig. 6;

Fig. 8 is an end elevation of the gauge slide shown in Figs. 6 and 7;

Fig. 9 is a side elevation of a gauge slide provided with a straight pin;

Fig. 10 is a top plan view of the gauge slide shown in Fig. 9;

Fig. 11 is a bottom plan view of the gauge slide shown in Figs. 9 and 10;

Fig. 12 is a side elevation of a gauge slide having an arcuately cut away pin stem and upper plate;

Fig. 13 is a top plan view of the gauge slide shown in Fig. 12;

Fig. 14 is a side elevation showing an exterior view of the superior dental arch illustrating the manner of cutting parallel channels on the proximal contact surfaces of separated teeth;

Fig. 15 is a side elevation showing an exterior view of the superior dental arch illustrating the manner of cutting parallel channels on remote contact surfaces of teeth; and Fig. 16 is a side elevation showing an exterior view of the superior dental arch illustrating the manner of drilling parallel holes in the occlusal surfaces of teeth.

Briefly stated the device comprises a spacer bar which is adapted to be detachably connected to the hand piece of a dental engine and to extend radially therefrom. On the radially extending spacer bar is slidably mounted a gauge pin which is adapted to be spaced parallel to the drill at any required distance therefrom.

Referring to Fig. 1, the numeral 10 indicates a right angle hand piece of a dental engine with the parallel cutting gauge 11 attached thereto. The gauge 11 comprises a clamping portion 12 and a track portion 13 extending therefrom. The clamping portion 12 includes a floor 14 provided with a central opening 15 for the passage of a drill 16 and a wall 17 adapted to surround the end of the drill head 18 and to be rigidly connected thereto by means of the clamping screws 19 and thumb nut 20 which are threaded to the sleeve 21 of drill head 18 which project through the circular opening 15 in the floor thereof as shown in Fig. 5.

The track portion of the gauge comprises parallel tracks 22 and 22' which are provided with grooves 23 and 23' along their lower inner edges for the passage of a sliding plate of the slide member 24 to which is attached a gauge pin 30 and notches 33 and 33' for the retention of a rubber band 65 as will be further explained.

The slide member 24 comprises upper and lower sliding plates 25 and 26, having flat surfaces and being separated from each other by a standard 27 which is of sufficient length to allow the plates to move freely over the upper surfaces of the tracks 22 and 22' and within the grooves 23 and 23'. From the upper plate 25 projects a short stem 28 surmounted by a cap 29 of slightly larger diameter. The stem 28 and the shaft 27 are preferably located on the same centerline as shown in Fig. 6.

From the lower surface of the lower plane 26 projects a gauge pin 30, which in the particular model of slide member shown in Fig. 6, is offset by an angular portion 31. The gauge pin 30 is formed with a threaded base 30' which engages a tapped hole in the base 31. With the design shown the gauge pin is interchangeable with pins of various sizes which correspond to burrs such as 700, 701, 702, etc., or 556, 557 and 558. The offset construction permits the operator to cut parallel holes or channels which are very closely aligned as the angular or slanting portion 31 will clear the nut 20 and thereby allow the pin 30 to be moved close to the drill. The upper plane 25 is notched at 32 and 32' to receive a rubber band to effect separation of the pin 30 from the drill 16 or to bring them into closer proximity as shown in Figs. 14 and 15 respectively and which will be further explained in the description of the operation of the device which follows.

For the straight hand piece as illustrated in Fig. 2 the cutting gauge 41 comprises a clamping portion 42 and a track portion 43 extending therefrom. The upper part of the clamping portion is cylindrical in form but tapers toward its lower extremity to fit the end of the hand piece. The cylindrical part of the gauge member is provided with a set screw 44 to retain it rigidly to the hand piece. Another small screw 44' is provided near the extremity of the tapered portion which functions as a means for the retention of a rubber band as will be further explained.

From the tapered end of the clamping portion of the gauge extends the track portion 43 which is similar to the track portion illustrated in Fig. 1. The parallel tracks 45 are provided with grooves 46 along their lower inner edges for the passage of the lower sliding plate of a slide member as explained with reference to the gauge for the angle hand piece.

A form of slide member used with this type of gauge as shown in Fig. 2 is constructed with an offset pin, or one not in alignment with the standard 47 separating the upper and lower plates 48 and 49. The offset is effected by extending the lower plate 49 beyond the location of the standard 47 and arranging the pin 50 to project at the end of the plate. With this design the pin 50 may be brought very close to the drill 51 when it is necessary to drill parallel holes or to cut channels close together. Gauge pin 50 may be made interchangeable by providing it with a threaded base 50' which is adapted to engage a threaded hole in the lower plate 49. With this construction various size pins corresponding to gauges 556, 557, 700 and 701, etc., may be employed.

Several variations in forms of guide members may be used with either the gauge for the angle hand piece or with the straight hand piece.

One of the modified forms of gauge members is illustrated in Figs. 9, 10 and 11. In this form the gauge pin 52 is not offset and is arranged in alignment with the standard 53 which separates the upper and lower plates 54 and 55. It will be noted that in this form the cap 56 as well as the stem 57 are cut away on one side to allow the pin 52 to be moved close to the drill. This form may be used with either the gauge for angle handle pieces or that for straight hand pieces. Notches 58 and 58' adapted to engage a rubber band are formed in the upper plate.

Another type of slide member which is used with the straight hand piece is illustrated in Figs. 12 and 13. On this type the pin is in alignment with the standard 59 separating the upper and lower plates 60 and 61, and the upper plate 60 and cap 62 are cut away arcuately at one end as indicated by the numeral 63 so that the pin 64 may be moved closer to the drill.

In the operation of the device which is used mostly in the preparation of teeth for anchoring bridges, a surface of a tooth is first drilled or a channel cut therein and then the gauge pin is placed within the channel or drilled hole, and a similar parallel channel or hole drilled, the parallel channels or holes being adapted to retain anchoring projections or pins extending from the bridge.

In Fig. 14 it will be noted that parallel channels are drilled on the anterior surface of a third molar and the posterior surface of a first bicuspid. To accomplish this a channel is first drilled in one of these teeth without the use of the gauge, and then the gauge pin is placed in this channel and the slide member allowed to move along the tracks under the tension of the rubber band until the place is reached where it is desired to place the drill in order to cut second channel parallel to the first cut channel. It will be noticed that in this case the rubber band 65 extends around the base of the pin 31 passing through notches 32 and 32' in plate 25 and through notches 33 and 33' in parallel tracts 22 and 22' and then under cap 29 of stem 28. This exerts a push instead of a pull on the pin support member thus tending to separate the pin from the drill, and thus holds the gauge in place while the second channel is being cut.

In Fig. 15 a different problem is presented, that is where the pin and the drill operate on the surfaces which are on the opposite sides of one or more teeth. The illustration shows the manner of drilling channels on the posterior surface of a first molar and the anterior surface of a second bicuspid. In this case it is necessary for the rubber band 65 to exert a pull on the pin support member which will tend to bring the pin 30 and the drill 16 closer together, and therefore it is extended over the screws 19 on the sides of the clamping portion 12 of the gauge and the stem of the pin support member.

Fig. 16 shows the manner in which parallel holes are drilled in the occlusal surfaces of teeth. In the example shown a hole which has already been drilled in the occlusal surface of a third molar functions as a guide for the pin as a parallel hole is drilled into the occlusal surface of a second bicuspid. In this case where holes are drilled it will be noted that it is not necessary to use a rubber band to retain the drill in contact with the surface being cut as when in forming parallel channels.

While we have in the present description and disclosure set forth with particularity a preferred form of construction, it will be understood that the device is susceptible of wide modifications and changes without departing from the scope and spirit of the invention, thus other means for attachnig the device to dental hand-pieces of various types may be used, and therefore we do not wish to be confined to the exact details set forth with respect to this or other elements of the apparatus which may thus be altered without effecting its basic design and function.

Having thus described our invention, what we claim as new and wish to secure by Letters Patent is:

1. A device for producing parallel cuts for dental bridgework comprising a gauge including a clamping portion adapted to be removably attached to a drill holder supporting a drill, and a track portion projecting from said clamping portion, a slide member adjustably mounted on said track portion, said slide member being provided with a gauge pin and adapted to retain said pin parallel to said drill, whereby the proximity of the drill with respect to the pin may be controlled by the operator for effecting parallel cuts at predetermined distances, and means for increasing the parallel spacing of said gauge pin and drill to thereby retain them within said cuts during the cutting operation.

2. A device for producing parallel channels for dental bridgework comprising a gauge including a clamping portion adapted to be removably attached to a drill holder supporting a drill, and a track portion projecting from said clamping portion, a slide member mounted on said track portion, said slide member being provided with a gauge pin projecting therefrom parallel to said drill, and resilient means in connection with said means and said slide member adapted to adjust the distance between the parallel alignment of said gauge pin with respect to said drill to thereby retain the gauge in said parallel channels by the exertion of pressure on the walls thereof.

3. A dental gauge for producing parallel cuts comprising a clamping portion adapted to be removably attached to a drill holder supporting a drill, and a track portion including parallel tracks projecting from said clamping position, a slide member mounted on said tracks, said slide member being provided with a gauge pin projecting therefrom parallel to said drill, and means in connection with said track and said slide member adapted to exert a pull on said slide member to increase the parallel spacing between said gauge pin and said drill and thereby retain them within said parallel cuts.

4. A dental gauge for producing parallel cuts comprising a clamping portion adapted to be removably attached to a drill holder supporting a drill, and a track portion including parallel tracks projecting from said clamping portion, a slide member mounted on said tracks, said slide member being provided with a gauge pin projecting therefrom parallel to said drill, and elastic means in connection with said track and said slide member adapted to exert a pull on said slide member toward said clamping portion to move said gauge pin closer to said drill to thereby retain them within said cuts.

5. A dental gauge of the class described comprising a clamping portion adapted to be removably attached to a drill holder retaining a drill therein, and a track portion projecting from said clamping portion, said track portion comprising parallel tracks provided with longitudinal grooves and with notches at the extremities thereof, a slide member including an upper notched sliding plate and a lower sliding plate, said plates engaging the upper and grooved surfaces of said tracks, a capped stem and a gauge pin projecting respectively from said upper and lower plates, said pin being parallel to said drill, means comprising an elastic band connected with said stem and said pin and engaging the notches in the ends of said tracks and in said upper sliding plate adapted to exert a pull on said slide member tending to move it away from said clamping portion and thereby move the gauge pin farther away from said drill.

6. A dental gauge of the class described comprising a clamping portion adapted to be removably attached to a drill holder retaining a drill, said clamping portion including walls partially surrounding said drill holder and provided with clamping screws adapted to engage the same, a track portion comprising parallel tracks projecting outwardly from said clamping portion, said tracks being provided with longitudinal grooves and with notches at the extremities thereof, a slide member including upper and lower plates slidably engaging the upper and grooved surfaces of said tracks, and a capped stem and a gauge pin projecting respectively from said upper and lower plates parallel to said drill, and means comprising an elastic band connected with said stem and said clamping screws adapted to exert a pull on said slide member toward the clamping portion of the gauge to thereby move said gauge pin toward said drill.

7. A dental gauge of the class described comprising a clamping portion adapted to be removably attached to a drill holder retaining a drill, said clamping means including a tapered sleeve adapted to surround said drill holder provided with clamping screws adapted to engage the same, a track portion comprising parallel tracks projecting outwardly from said clamping portion and provided with longitudinal grooves and with notches at the extremities thereof, a slide member including upper and lower plates slidably engaging the upper and grooved surfaces of said tracks, said upper plate being formed with an arcuate cut-out portion to conform with the curvature of said tapered sleeve, a capped stem and a gauge pin projecting respectively from said upper and lower plates parallel to said drill, and means comprising an elastic band connected with said stem and said clamping portion adapted to exert a pull on said slide member in the direction of said clamping portion to thereby move said gauge pin toward said drill.

8. A dental gauge of the class described comprising a clamping portion and a track portion, said clamping portion including a sleeve adapted to fit a drill head retaining a drill, and means in connection with said sleeve for detachably connecting it to said head, said track portion including parallel tracks projecting in a plane at right angles to the center line of said sleeve, said tracks being provided with longitudinal grooves and with notches at the extremities thereof, a slide member adapted to engage the upper surface of said tracks and the grooves therein, a capped stem and a gauge pin projecting upward and downward from said slide member and parallel to said drill, and an elastic means in connection with said slide to effect the relative movement of said slide with respect to said drill.

9. A dental gauge of the class described comprising a clamping portion and a track portion, said clamping portion including a tapered sleeve adapted to engage a drill head retaining a drill therein, said sleeve being provided with a clamping screw and a retaining screw, said track portion including parallel tracks projecting radially from said sleeve and provided with longitudinal grooves, and with notches at their outer extremities, a slide member including upper and lower plates, separated by a standard adapted to engage the upper surface of said tracks and said grooves, a capped stem and a gauge pin projecting respectively from the center and end portion of said upper and lower plates, and means comprising an elastic band adapted to engage said capped stem and said tapered sleeve above said retaining screw to exert a pull on said slide member tending to move the same toward the clamping portion of said gauge and thereby bring said gauge closer to said drill.

10. A dental gauge for producing parallel cuts adapted to be detachably connected to a drill head of an angle hand piece, said drill head being provided with a projecting threaded collar surrounding a drill mounted therein, said gauge comprising a clamping portion having side walls extending adjacent and along the sides of said drill head, clamping screws for clamping said walls to said drill head, and a floor provided with a central opening adapted to extend beneath said drill and to receive said threaded collar and a nut provided with a central opening for the passage of said drill, said nut being threadedly connected to said collar to rigidly retain said floor to the bottom of said head, and a track portion including parallel tracks extending from said clamping portion, said tracks being provided with longitudinal grooves and with notches at the outward extremities thereof, a slide member mounted on said tracks, said slide member being provided with a capped stem and a gauge pin projecting therefrom parallel to said drill, said pin having an upper sloping portion adapted to allow the pin to underlie said threaded flange and nut of said clamping portion to thereby allow closer parallel alignment of said gauge pin and drill, and elastic means in connection with said sliding member to retain the gauge pin and the drill within said parallel cuts.

11. A device for producing parallel cuts in dental bridgework comprising a gauge including a clamping portion adapted to be removably attached to a drill holder supporting a drill, and a track portion projecting from said clamping portion, a slide member adjustably mounted on said track portion, said slide member being provided with a gauge pin projecting therefrom parallel to said drill, whereby the proximity of the drill with respect to the pin may be controlled by the operator for effecting parallel cuts at predetermined distances, and means in connection with said slide member and said clamping portion adapted to exert pressure of said drill and gauge pin on the side walls of said cuts to thereby retain them within said cuts during the cutting operation.

PHILIP I. KLEIN.
AARON Z. SHEVSKY.